(12) United States Patent
Cambon et al.

(10) Patent No.: US 11,298,985 B2
(45) Date of Patent: Apr. 12, 2022

(54) TREAD WITH CONCEALED CAVITIES COMPRISING A WEAR INDICATOR HAVING IMPROVED VISIBILITY

(71) Applicant: COMPAGNIE GENERALE DES ETABLISSEMENTS MICHELIN, Clermont-Ferrand (FR)

(72) Inventors: Stéphanie Cambon, Clermont-Ferrand (FR); Olivier Muhlhoff, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 260 days.

(21) Appl. No.: 15/769,650

(22) PCT Filed: Oct. 28, 2016

(86) PCT No.: PCT/EP2016/076125
§ 371 (c)(1),
(2) Date: Apr. 19, 2018

(87) PCT Pub. No.: WO2017/072318
PCT Pub. Date: May 4, 2017

(65) Prior Publication Data
US 2018/0312012 A1 Nov. 1, 2018

(30) Foreign Application Priority Data

Oct. 29, 2015 (FR) ...................................... 15/60375

(51) Int. Cl.
*B60C 11/24* (2006.01)
*F16L 11/02* (2006.01)
(Continued)

(52) U.S. Cl.
CPC .......... *B60C 11/24* (2013.01); *B60C 11/0323* (2013.01); *B60C 11/12* (2013.01);
(Continued)

(58) Field of Classification Search
CPC . B60C 11/1353; B60C 11/24; B60C 11/1281; B60C 11/0323; B60C 2011/1361
See application file for complete search history.

(56) References Cited

U.S. PATENT DOCUMENTS 4,198,774 A * 4/1980 Roberts ................. B60C 13/001
152/523
6,253,815 B1 * 7/2001 Kemp ....................... B44F 1/02
152/523
(Continued)

FOREIGN PATENT DOCUMENTS

EP 2311655 A1 4/2011
EP 2311655 B1 * 7/2013 ......... B60C 11/1281
(Continued)

OTHER PUBLICATIONS

Machine translation of JP08-258517 (no date).*
(Continued)

*Primary Examiner* — Katelyn W Smith
*Assistant Examiner* — Philip N Schwartz
(74) *Attorney, Agent, or Firm* — Dickinson Wright PLLC; Steven Hurles

(57) ABSTRACT

A tire comprising a tread, this tread comprising at least one channel and at least one wear indicator that is disposed on the bottom of the channel. The wear indicator has a contact face which is intended to come into contact with a road surface when the tire reaches a wear limit. The contact face has a texture that contrasts with the bottom of the channel.

9 Claims, 2 Drawing Sheets

(51) Int. Cl.
*F16L 33/30* (2006.01)
*F16L 33/00* (2006.01)
*F16L 33/32* (2006.01)
*B60C 11/03* (2006.01)
*B60C 11/12* (2006.01)

(52) U.S. Cl.
CPC .............. *F16L 11/02* (2013.01); *F16L 33/00* (2013.01); *F16L 33/30* (2013.01); *F16L 33/32* (2013.01); *Y02E 10/30* (2013.01)

(56) References Cited

U.S. PATENT DOCUMENTS

| | | | | |
|---|---|---|---|---|
| 2008/0023116 | A1* | 1/2008 | Mayni | B60C 11/24 152/154.2 |
| 2011/0277898 | A1* | 11/2011 | Barraud | B60C 11/0306 152/209.18 |
| 2012/0227883 | A1 | 9/2012 | Audigier et al. | |
| 2013/0206291 | A1* | 8/2013 | Emorine | B60C 11/0323 152/154.2 |
| 2014/0367011 | A1 | 12/2014 | Colby et al. | |
| 2017/0072749 | A1 | 3/2017 | Muhlhoff et al. | |
| 2018/0072107 | A1* | 3/2018 | Muhlhoff | B60C 11/1353 |

FOREIGN PATENT DOCUMENTS

| | | | | |
|---|---|---|---|---|
| FR | 3034358 | A1 * | 10/2016 | ............ B60C 11/24 |
| JP | 06099705 | A * | 4/1994 | ............ B60C 11/13 |
| JP | 07205615 | A * | 8/1995 | ............ B60C 11/00 |
| JP | 08258517 | A * | 10/1996 | ............ B60C 11/24 |
| WO | 2011039194 | A1 | 4/2011 | |
| WO | 2013115810 | A1 | 8/2013 | |
| WO | 2015/135928 | A1 | 9/2015 | |

OTHER PUBLICATIONS

Machine translation of EP2311655 (no date).*
Machine translation of JP06-099705 (no date).*
International Search Report (PCT/ISA/210) Regarding PCT/EP2016/076125 dated Feb. 1, 2017.

* cited by examiner

TREAD WITH CONCEALED CAVITIES COMPRISING A WEAR INDICATOR HAVING IMPROVED VISIBILITY

CROSS-REFERENCE TO RELATED APPLICATION

The present invention claims priority to PCT International Patent Application Serial No. PCT/EP2016/076125, filed Oct. 28, 2016, entitled "TREAD WITH CONCEALED CAVITIES COMPRISING A WEAR INDICATOR HAVING IMPROVED VISIBILITY," which claims the benefit of FR Patent Application Serial No. 1560375, filed Oct. 29, 2015.

1. BACKGROUND OF THE INVENTION Field of the Invention

The present disclosure relates to a tire having a tread provided with underlying voids beneath its tread surface. The disclosure relates more particularly to means formed on this tire for improving the visibility of wear limit indicators as soon as these underlying voids are open and form new grooves.

2. RELATED ART

As is known, the use of tires in wet weather running conditions requires rapid elimination of the water present in the contact patch in which the tire makes contact with the road surface in order to ensure that the material making up the tread comes into contact with this road surface. The water which is not pushed ahead of the tire flows or is collected partially in the grooves formed in the tread of the tire.

These grooves form a flow network which needs to be lasting, that is to say effective throughout the duration of use of a tire between its new state and its removal on account of wear reaching the limit set by regulations.

All-weather running conditions require that a tire comprise, in its tread, a volume of voids that are permanently open at its tread surface in order to drain any water present on the road surface. This should be satisfied throughout the duration of use and notably until the tire is completely worn down.

It is known to form, in the new state, grooves having depths that correspond to a height greater than the maximum height of material to be worn away, so as to maintain a minimum voids volume throughout the duration of use of the tire. This has the consequence of reducing the stiffness of the tread, this being unfavorable from the point of view of wear.

In a new generation of voids, a total voids volume that is reduced compared with the usual solution that has just been described is formed in a tread, this total voids volume being split between a volume that opens onto the tread surface in the new state and a voids volume formed under the tread surface in the new state. The open part corresponds to grooves having depths that may be reduced compared with the thickness of material to be worn away. The closed part corresponds to hidden-voids volumes formed by channels. These channels are intended to open onto the tread surface once the tread has been partially worn away to a predetermined extent. These new voids volumes thus compensate for the reduction in the voids volumes of the grooves that initially open onto the tread surface in the new state.

By virtue of these new grooves, it is possible to limit the reduction in stiffness of the tread in the new state through the additional presence of material.

In order to limit the lowering in stiffness associated with the presence of grooves that is required as a result of the need to ensure the drainage of water, a solution described in the patent publication WO 2011/039194 has been proposed. According to that solution, a tire tread having a thickness E is proposed, this tread being provided with a plurality of discontinuous grooves over the tread surface and having a geometry that undulates in the thickness of the tread. Each undulating groove is discontinuous at the surface but continuous in the interior of the tread in the new state in order to allow fluid to flow. This undulating groove is formed in the tread by a series of external cavities that open onto the tread surface in the new state and a plurality of internal cavities, the latter being positioned radially and entirely inside the tread surface in the new state between the external cavities. The internal cavities may be provided to be at different depths inside the tread. Moreover, the continuity of the flow of water in each undulating groove in the new state is ensured by the presence of linking cavities, each linking cavity connecting an external cavity to an internal cavity. Each linking cavity has two ends, one of these ends being connected to an internal cavity on one side and the other end being connected to an external cavity on the other side. Each linking cavity has cross sections (in a section plane perpendicular to the mean direction of the groove), the areas of which are other than zero and are respectively equal to the areas of the cross sections of the internal and external cavities connected by this linking cavity.

In order to maintain the level of safety of a vehicle, it is essential that the user check the level of tire wear regularly. To this end, the user can study the surface of the tread of his tires and can measure the depth of the visible voids. This measurement is made easier by an element that the tire manufacturer provides on all types of tire: the wear indicator. The wear indicator makes it possible to evaluate the level of wear of the tires on the basis of a reliable reference. This indicator is usually molded into the grooves. Thus, when the surface of the tread of a tire reaches the same height as the wear indicators, it is necessary to replace the tire or to renew the tread thereof by way of a retreading operation.

The document EP 2311655 A1 discloses a tire the tread of which comprises a channel and at least one wear indicator.

In the case of tires comprising at least one channel intended to form a groove once its tread has been partially worn away, it is also necessary to inform the user of the possibility of still running for a certain amount of time before it is necessary to change the tires on account of wear. This information should be imparted strongly as soon as a new groove is formed in the tread surface. There is a risk of conventional wear indicators not being sufficiently distinguishable at the bottom of the new groove.

The disclosure provides various technical means for solving this problem.

Definitions

A "tire" means all types of resilient tread, whether or not it is subjected to an internal pressure.

A wear indicator or wear limit indicator means a means that indicates the wear limit from which it is necessary to change the tire or to renew its tread.

A "rubber material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubbery material delimited by lateral surfaces and by a tread surface which is intended to come into contact with a road surface.

A "texture" means an organized arrangement of a plurality of elements in relief, all or some of the elements in the arrangement being the repetition of one and the same basic element, for example a strand or a lamella. These basic elements may be realized so as to protrude from a surface or to be recessed into this surface. This arrangement creates an arithmetic mean roughness Ra with a value of at least 12. A surface that does not have a texture is interpreted here as being a surface with an arithmetic mean roughness Ra of less than 12.

A "strand" means a filiform element, the height of which is at least equal to twice the diameter of a disc having the same surface area as the mean cross section of the strand.

"Lamellae" means elongate elements having a length at least equal to twice their height.

"Lightness" or "luminance" means the parameter which characterizes a surface to reflect light to a greater or lesser extent. Lightness is expressed using a scale that ranges from 0 to 100 according to the L*a*b* color model established by the CIE (International Commission on Illumination) in 1976. The value 100 represents white or total reflection; the value 0 represents black or total absorption.

The equatorial mid-plane is a plane perpendicular to the axis of rotation and passing through the points of the tire that are radially farthest from said axis.

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

The total thickness E of a tread is measured, on the equatorial plane of the tire provided with this tread, between the tread surface and the radially outermost part of the crown reinforcement in the new state.

A tread has a maximum thickness of material that can be worn away during running, this maximum wearable thickness of material being less than the total thickness E.

The usual running conditions of the tire or use conditions are those which are defined by the E.T.R.T.O. standard for running in Europe; these use conditions specify the reference inflation pressure corresponding to the load-bearing capability of the tire as indicated by its load index and speed rating. These use conditions may also be referred to as "nominal conditions" or "working conditions".

A cut generically denotes either a groove or a sipe and corresponds to the space delimited by walls of material that face one another and are at a non-zero distance from one another (referred to as the "width of the cut"). It is precisely this distance that differentiates a sipe from a groove: in the case of a sipe, this distance is suitable for allowing the opposing walls that delimit said sipe to come into at least partial contact at least when the sipe enters the contact patch in which the tire is in contact with the road surface. In the case of a groove, the walls of this groove cannot come into contact with one another under the usual running conditions as defined for example by the E.R.T.O.

A groove is said to be continuous when it opens onto the tread surface in the new state, specifically along its entire extent. The main direction of a groove corresponds to the main direction of a flow of liquid in said groove.

A groove is said to be discontinuous when it is formed from a succession of parts that open onto the tread surface in the new state, these parts being separate from one another in the main direction of this groove (i.e. its extent). These parts that are separate at the surface may be connected together by underlying parts beneath the tread surface in the new state.

The mean surface of a continuous or discontinuous groove is defined as being a virtual surface that divides this groove, in the main direction of this groove, into two equal or substantially equal parts.

The main direction of a groove corresponds to the direction of a flow of water in the groove when running on a road surface covered with water.

SUMMARY OF THE INVENTION

It is an object of the present disclosure to form a tire, the tread of which has at least one hidden channel, or a part forming a hidden channel, this channel being intended to open onto the surface of the tread once it has been partially worn away to a predetermined extent, so as to form a groove. Combined with this at least one channel, a wear limit indicator is formed in this channel, which is intended to be visible once said channel opens onto the tread surface, i.e. during the formation of a new groove.

The disclosure proposes a means for making it easier to identify or locate wear indicators on the tread.

To this end, the disclosure relates to a tire comprising a tread, this tread comprising at least one hidden channel that is intended to open onto the surface of the tread to form a new groove once it has been worn away to a predetermined extent, at least one wear indicator disposed in relief on the bottom of this channel, this wear indicator having an appropriate height corresponding to a wear limit for the tread. This wear indicator comprises a contact face intended to come into contact with a road surface when the tire reaches the limit wear limit. This contact face of the wear indicator is provided with means that give the contact face a first lightness (L*1). Moreover, the bottom of the channel has a lightness known as second lightness (L*2).

Advantageously, the first lightness (L*1) of the contact face of the wear indicator is less than the second lightness (L*2) of the bottom of the channel. The difference in lightness between the first and second lightness being at least 5 lightness units (on a scale ranging from 0 to 100) so as to generate a contrast between the bottom of the channel and the contact face of the wear indicator, the means for obtaining the first lightness corresponding to a texture formed by integrally formed motifs with a repetitive mean spacing chosen to be at least equal to 0.1 mm and at most equal to 0.6 mm.

Such a difference in lightness makes it possible to create a contrast effect that is easily perceptible to a user once the channel forms a new groove that opens onto the tread surface. This contrast effect serves to easily locate the wear indicator, which is conventionally difficult to find on a tread without a contrast effect. The user can thus identify and locate the wear indicators on his tires with greater ease, making it easier to check tire wear.

In order to reduce the lightness of the contact face of the wear indicator, this face may be provided with a texture that enables the absorption of light and tends to give a deep black color to this contact face. The contact face of each wear indicator textured in this way absorbs virtually all the light received when the channel opens onto the tread surface and forms a new groove. Conversely, the smoother surfaces of the channel bottom that have greater lightness allow more or less significant reflection of the light.

The first lightness (L*1) is advantageously between 5 and 18 units, and preferably between 8 and 16 units. The values tend towards black so as to absorb incident light well.

The lightness of the bottom of the channel (or second lightness) is between 20 and 35 units. The values tend towards white so as to reflect incident light.

According to one advantageous embodiment, the wear indicator comprises at least one lateral face connecting the contact face of the wear indicator to the bottom of the channel, this lateral face being provided with a texture that may be similar to the one formed on the contact face. The textured lateral face further helps to improve the visibility of the wear indicator in the groove.

In a variant, the texture is recessed into the contact face of the indicator. One advantage of such a recessed disposition is that the texture thus formed does not disrupt the measurement of the height of the wear indicator.

In another variant of the disclosure, the presence of measuring wells for measuring the thickness to be worn away until the wear limit indicators are reached can be associated with underlying channels beneath the tread surface in the new state. Advantageously, such a measuring well is formed vertically above a wear indicator so as to allow a part of the contact face of this indicator and at the same time a part of the bottom of the channel to be seen. The difference in lightness between the two parts makes it easier for the user to find the wear indicator. By virtue of each well, it is possible to measure the total thickness (distance between the tread surface in the new state and the bottom of the channel) and the thickness to be worn away (distance between the tread surface in the new state and the contact face of the indicator).

Further features and advantages of the disclosure will become apparent from the following description with reference to the appended drawings which show, by way of non-limiting examples, embodiments of the subject matter of the disclosure.

DETAILED DESCRIPTION OF THE ENABLING EMBODIMENTS

To make the figures easier to understand, identical reference signs have been used to denote variants of the disclosure where these reference signs refer to elements of the same kind, whether structurally or functionally.

Figure 1:
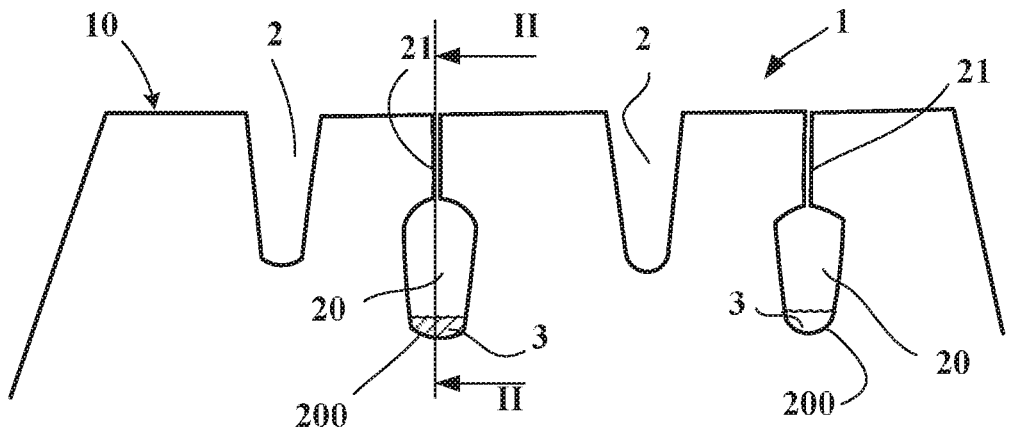
FIG. 1 shows a view in cross section of a tread having channels that are intended to form new grooves.

FIG. 1 shows a view in radial section (cross section realized in a plane containing the axis of rotation of the tire) of a tread 1 of a tire for a heavy-duty vehicle according to the disclosure.

The tread 1 shown comprises, in the new state, two circumferential grooves 2 that open onto a tread surface 10, each of these grooves 2 having a depth P1 and a mean width L1. In combination with these circumferential grooves 2 that open onto the tread surface 10 in the new state, two voids 20 that each form a channel are provided, these channels being situated entirely beneath the tread surface 10 in the new state and being intended to form new grooves once the tread has been partially worn away to a predetermined extent. In order to avoid a situation in which the tread does not have any grooves that open onto the tread surface in a state of wear, it is sensible for the new grooves formed by the channels 20 to open up before the grooves 2 that are open in the new state have completely disappeared.

The channels 20 are extended radially towards the outside of the tread by sipes 21 that facilitate the molding and demolding of the tread. These sipes 21 have the particular feature of closing as they pass through the contact patch during running Closing means that the opposite walls delimiting the sipe 21 come into at least partial contact and a contact pressure arises between these walls. These sipes may be provided with means that facilitate contact between the faces delimiting these sipes; these means may consist notably of zigzags or undulations.

By virtue of such an arrangement of the voids volumes in a tread, it is possible to put an appropriate quantity of rubbery material into contact with the road surface in order to ensure a good level of performance, whether the tread is in the new state or following partial wear, while preserving the conditions of safety and performance when running.

Of course, it is necessary to satisfy the requirements that result from different national regulations, and it is notably indispensable to meet the requirement of visual monitoring of tire wear by the user.

When the channels 20 open onto the tread surface once the tread has been partially worn away, it is necessary for the user to be given a strong visual warning that allows him to monitor the state of wear to his tire.

To this end, each channel bottom 200 is provided with at least one wear indicator 3 molded in relief on said bottom.

Figure 2:
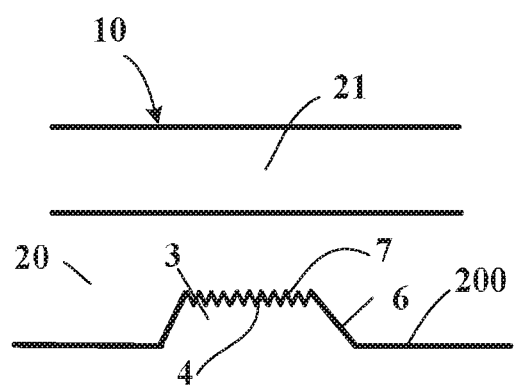
FIG. 2 shows a view in cross section of the tread shown in FIG. 1, on a section plane, the line of which is indicated by the line II-II.

In FIG. 2, which shows a cross section on a plane indicated by its line II-II in FIG. 1, it can be seen that the wear indicator 3 comprises a contact face intended to come into contact with a road surface when the tread reaches its wear limit. In the present case, the first lightness L*1 of the contact face of the wear indicator is equal to 12 and is obtained by forming on this contact face a set of mutually parallel ribs 12, each integral rib having a triangular cross section with a mean height equal to 0.35 mm. These ribs 12 are formed with a spacing equal to 0.2 mm.

The channel 20, and more particularly its bottom 200, comprises a smooth surface without any texture, meaning that the arithmetic mean roughness Ra thereof is less than 12. Moreover, the lightness of this surface L*2 is equal to 24. By virtue of this lightness value, the bottom surface 200 and the lateral surfaces of the channel 20 reflect incident light to a greater extent than the contact face 7 of the wear indicator 3. A more or less significant contrast effect is thus created.

This contrast effect between the bottom 200 of the channels 20 and the wear indicators 3 makes it possible to increase the visibility of these wear indicators, making it easier for a user to locate them and to monitor wear. Such a feature is particularly advantageous when the tread 1, following wear, is in a context in which visibility is limited.

Figure 3:
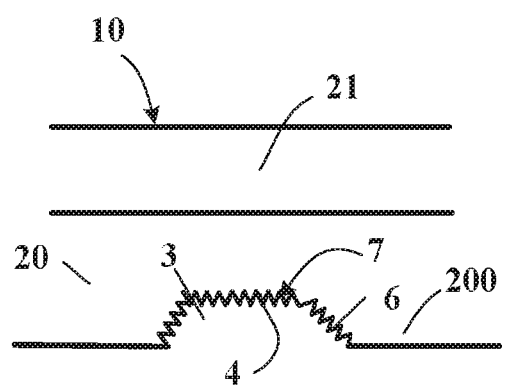
FIG. 3 shows a view in cross section of a first variant according to the disclosure.

In a variant of the disclosure, a wear indicator 3, the contact face of which is provided with a texture that gives a first lightness, may also have textured surfaces on at least one of these lateral faces 6, these lateral faces being situated between the contact face and the bottom of the channel FIG. 3 illustrates such an exemplary embodiment, in which the contact face 7 of the wear indicator 3 is textured, as are these lateral faces 6, such that the contrast with the bottom of the channel 200 is even stronger.

Figure 4:
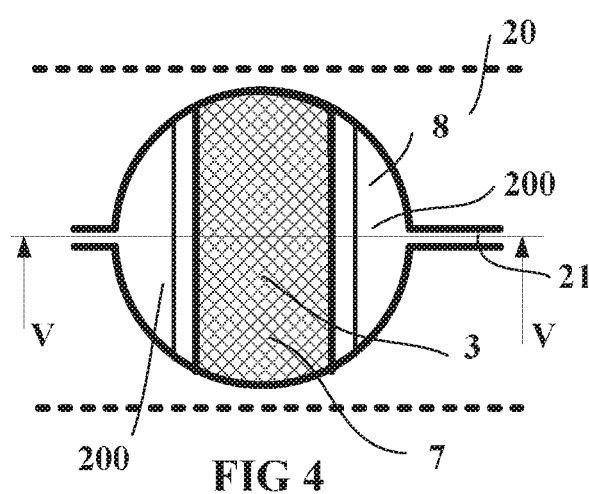
FIG. 4 shows a view of a measuring well for measuring the depth to be worn away.
Figure 5:
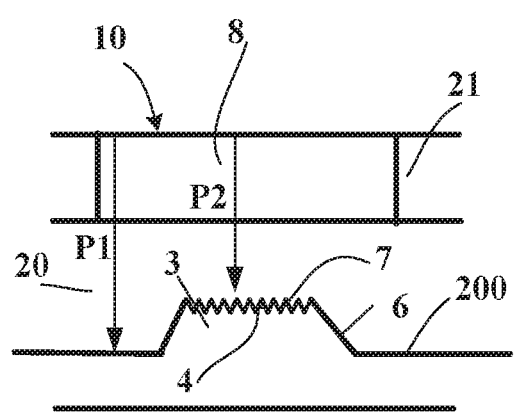
FIG. 5 shows a view in cross section on a section plane, the line of which in FIG. 4 is indicated by the line V-V.

In order to measure the thickness of material to be worn away, starting from the new state, it is sensible to form a measuring well vertically above each wear indicator, as is shown by way of example in FIGS. 4 and 5.

FIG. 4 shows a part of the tread surface of a tire according to the disclosure, having a sipe 21 that is extended on the inside by a channel 20. Moreover, a measuring well 8 is formed so as to pass through the sipe 21 in order to open onto the tread surface in the new state and into the channel 20. This measuring well is disposed vertically above a wear indicator 3 molded into the bottom 200 of the channel 20. In the present example, this measuring well has a circular cross section with an appropriate size for making it possible to partially see the textured contact face 7 of the wear indicator and also portions 201, 202 of the bottom 200 on either side of the indicator. This measuring well makes it possible to measure the remaining thickness to be worn away. The difference in lightness between the contact face of the indicator and the bottom of the channel makes it easier to perceive the indicator in the new state.

In FIG. 5, which shows a cross section of the device shown in FIG. 4, the measuring well 8 extending into the thickness of the tread can be seen. It will be noted that it is possible to measure both the remaining thickness to be worn away (P2) and the total thickness down to the bottom of the channel (P1) at any time.

The contrast effect mentioned in the above examples arises from the fact that the lightness of the zones provided with textures is less than that of the texture-free zones.

The appropriate appliance for measuring the lightness is a Konica-Minolta CM 700D spectrocolorimeter (registered trade mark). This appliance is suitable for measuring:
the lightness L*1, L*2 of the zones of the groove (zones covered with the texture, zones not covered with the texture);
a component a* which defines a first color shade between red and green;
a component b* which defines a second color shade between yellow and blue.

This appliance is positioned on the part of the tire to be measured and this appliance gives the values of the three parameters L*, a* and b* relative to a surface texture. These measurements are taken using the "SCI" (specular component included) mode, set at an angle of 10° and with a D65 type light setting (setting as defined by the International Commission on Illumination, CIE). By virtue of this appliance, the lightness of the textures of the groove 4 is measured, this then being compared with the lightness of the texture-free parts of the wear indicator.

The arrangement that promotes the visibility of the wear indicators 3 at the bottom of the channel 20 described above can advantageously be used for any type of tire.

FIGS. 6 to 11 illustrate examples of textures that can be employed on the bottom of a channel or any other type of hidden cavity in a tread, in order to allow better visibility of the wear indicators after partial wear.

Figure 6:
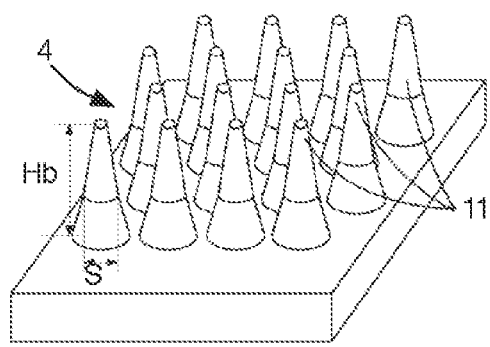
FIG. 6 shows a part of the texture of the groove according to a first exemplary embodiment in which the texture has protruding elements in the form of strands.

FIG. 6 illustrates an embodiment in which the texture has a plurality of strands 11. The strands 11 are distributed through the texture at a density at least equal to one strand per mm2, each strand having a mean cross section S of between 0.0005 $mm^2$ and 1 $mm^2$ It will be noted that the mean cross section of each strand corresponds to the mean of the cross sections S measured at regular intervals from the base of the strand. The strands have a conical overall shape with a cross section that decreases over the height Hb of these strands.

Figure 7:
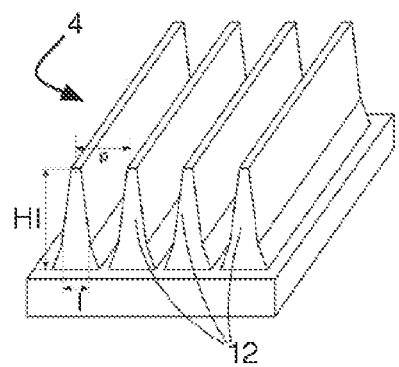
FIG. 7 shows a part of the texture of the groove according to a second exemplary embodiment in which the texture has protruding elements in the form of lamellae.

FIG. 7 illustrates an embodiment in which the texture is formed by a plurality of mutually parallel blades or ribs 12, the spacing of the blades 12 in the texture being at most equal to 0.5 mm, each blade 12 having a mean width of between 0.02 mm and 0.5 mm. It will be noted that the mean width corresponds to the mean of the widths 1 measured at regular intervals over the height Hl of the blade, the height of each blade being between 0.05 and 0.5 mm.

In another variant embodiment, the texture is constituted by a combination of strands 11 and/or blades 12.

The disclosure is not limited to the examples described and shown and various modifications can be made thereto without departing from its scope. Thus, according to another non-limiting variant embodiment, the blades 12 in FIG. 7 can be discontinuous. They have a flat part between one another. They can also have cross-sectional differences between one another. In addition, the blades can have curves or angles, notably along their length. They can also have a variable length.

Figure 8:
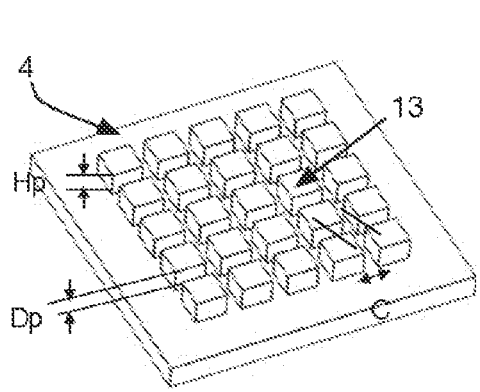
FIG. 8 shows a part of the texture of the groove according to a third exemplary embodiment in which the texture has protruding elements in the form of parallelepipeds.

In the example in FIG. 8, the texture is formed by a plurality of parallelepipeds 13 having a side length C of between 0.05 mm and 0.5 mm and a height Hp of between 0.05 mm and 0.5 mm, the distance Dp between two adjacent parallelepipeds being between 0.05 mm and 0.5 mm. In a variant, the cross section of the elements of the texture may be circular, polygonal (for example hexagonal). With the square or polygonal structures, it is possible to more easily organize the elements with respect to one another so as to limit the surface area of the intermediate zones between the elements.

Figure 9:
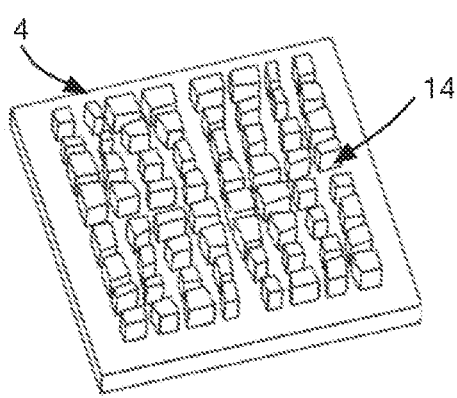
FIG. 9 shows a part of the texture of the groove according to a fourth exemplary embodiment in which the texture has protruding elements in which the shapes and the distances between protruding elements are variable.

In the variant in FIG. 9, the elements 14 of the texture have variable shapes and variable distances between one another. This variant makes it possible to render the details of the texture 4 less visible.

Figure 10:
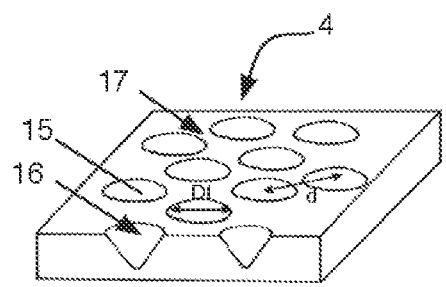
FIG. 10 shows a part of the texture of the groove according to a fifth exemplary embodiment in which the texture has recessed elements which are conical in this example.

FIG. 10 illustrates a texture according to another non-limiting variant embodiment. In this variant, the texture is formed by a plurality of cavities 16. The cavities 16 are in this case in the form of cones which extend into the depth and open onto a surface, forming circular openings 15 of diameter Df. The cavities 16 thus have a cross section which decreases with depth. It will be noted that, in this variant, the openings 15 of the cavities 16 are not in contact. The openings 15 are separated by intermediate zones 17. Moreover, the openings 15 are distributed regularly such that the distance d between the centers of the openings 15 is the same everywhere.

Figure 11:
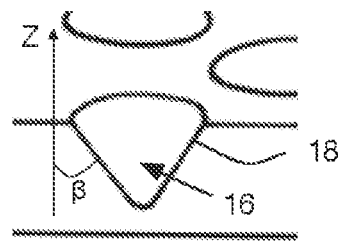
FIG. 11 shows an enlarged view of a cavity of a recessed element of the texture in FIG. 10.

FIG. 11 is an enlarged view of the texture in FIG. 10. In this case, all or some of the cavities have at least one wall 18 which, in cross section, forms an angle β of between 10° and 60° with respect to a direction Z perpendicular to the surface bearing the texture.

The figures and their descriptions given above illustrate, but do not limit, the disclosure.

Reference signs in the claims are entirely non-limiting. The verbs "comprise" and "have" do not exclude the presence of elements other than those listed in the claims.

Of course, the disclosure is not limited to the examples described and shown and various modifications can be made thereto without departing from the scope as defined in the claims. Notably, the above description with two channels could easily be designed with any type of void having at least one hidden part, that is to say formed in the new state under the tread surface and intended to open onto the tread surface once the tread has been partially worn away to a predetermined extent.

What is claimed is:

1. A tire comprising a tread, the tire comprising at least one channel that is situated entirely below a tread surface when said tread is in a new state and extending circumferentially around the tire and wherein the at least one channel is configured intended to open up to the tread surface after a given amount of wear in order to form a groove, this channel comprising two opposite walls connected by a bottom and at least one wear indicator on this bottom, the wear indicator comprising a contact face that is intended to come into contact with a road surface when the tire reaches a wear limit, wherein the contact face of the wear indicator comprises a texture that gives it lightness known as first lightness (L*1) when said tread is new, the bottom of the channel being without a texture so that it has a lightness known as second lightness (L*2) when said tread is new, the lightnesses being expressed using a scale that ranges from 0 to 100 according to the L*a*b* color model established by the International Commission on Illumination, this tread being such that the first lightness is less than the second lightness in order to create a contrast between the bottom of the channel and the contact face of the wear indicator, the texture for obtaining the first lightness including integrally formed motifs with a repetitive mean spacing at least equal to 0.1 mm and at most equal to 0.6 mm, and wherein at least one measuring well is formed that opens onto the tread surface in the new state and leads into the channel in order to allow a part of the contact face of a wear indicator with the texture and the bottom of the channel without the texture to be seen.

2. The tire according to claim 1, wherein the difference in lightness between the first and second lightnesses is at least 5 units of lightness.

3. The tire according to claim 1, wherein the bottom of the channel without the texture has an arithmetic mean roughness Ra of this bottom is less than 12.

4. The tire according to claim 1, wherein the first lightness (L*1) is between 5 and 18 units.

5. The tire according to claim 1, wherein the lightness of the bottom of the channel is between 20 and 35 units.

6. The tire according to claim 1 wherein the wear indicator comprises at least one lateral face connecting the contact face of the wear indicator to the bottom of the channel, this lateral face having a texture that has a lightness (L*1) that is less than the lightness of the bottom of the channel.

7. The tire according to claim 1, wherein the components a* and b* of the bottom of the channel are less than 5 points.

8. The tire according to claim 1 wherein the at least one channel is hidden when said tread is new.

9. The tire according to claim 8 wherein the groove that is formed by the at least one channel that is hidden when the tread is new and that includes the wear indicator is a first groove, wherein the at least one channel extends from the contact face to a first depth, the tire further including at least one second groove opens to the contact face when the tread is new, the at least one second groove extending from the contact face to a second depth, the first depth being greater than the second depth.

\* \* \* \* \*